United States Patent [19]
Fleischer

[11] Patent Number: 5,960,383
[45] Date of Patent: Sep. 28, 1999

[54] EXTRACTION OF KEY SECTIONS FROM TEXTS USING AUTOMATIC INDEXING TECHNIQUES

[75] Inventor: Robert John Fleischer, Groton, Mass.

[73] Assignee: Digital Equipment Corporation, Houston, Tex.

[21] Appl. No.: 08/805,780

[22] Filed: Feb. 25, 1997

[51] Int. Cl.$^6$ .............................. G06F 17/27; G06F 17/30
[52] U.S. Cl. ................................. 704/9; 707/530
[58] Field of Search ..................... 704/1, 9, 10; 707/500, 707/530, 531

[56] References Cited

U.S. PATENT DOCUMENTS

| | | | |
|---|---|---|---|
| 4,965,763 | 10/1990 | Zamora | 704/1 |
| 5,077,668 | 12/1991 | Doi | 704/1 |
| 5,384,703 | 1/1995 | Withgott et al. | 704/8 |
| 5,638,543 | 6/1997 | Pedersen et al. | 704/1 |
| 5,642,518 | 6/1997 | Kiyama et al. | 704/8 |
| 5,680,628 | 10/1997 | Carus et al. | 704/9 |
| 5,708,825 | 1/1998 | Sotomayor | 704/1 |
| 5,778,397 | 7/1998 | Kupiec et al. | 704/1 |

OTHER PUBLICATIONS

"Verity SEARCH'97 Developer's Kit Shipping Now", Dec. 11, 1996, http://www.verity.com/PR/961211dk.html.

"Oracle ConText Option V1.2 Questions and Answers A Customer's Guide" Feb., 1997, http://www.oracle.com/products/oracle/oracle7/oracle7.3/html/context_qa.html, p. 4.

"Oracle ConText Option", Feb., 1997, http://www.oracle.com/products/oracle7/oracle7.s/html/context_ds.html.

"Microsoft Word 97 Product Enhancement Guide—4", 1997, http://www.microsoft.com/office97 . . . ments/o97revgd/pegs/wrd97peg/wrdpeg4.html, p. 7.

*Primary Examiner*—Forester W. Isen
*Assistant Examiner*—Patrick N. Edouard
*Attorney, Agent, or Firm*—Hamilton, Brook, Smith & Reynolds, P.C.

[57] ABSTRACT

A document condensation method and apparatus produce a document synopsis are provided in which automatic indexing techniques are used to analyze an input document to determine a list of words and phrases characteristic of the subject matter of the document. Sections of the document are compared to the list of characteristic words and phrases to determine which sections of the document are most like the overall document in view of subject matter. A predetermined number of sections determined to be most similar to the overall document in content are provided as a condensed version of the whole document.

14 Claims, 5 Drawing Sheets

NOUN
PHRASES, 26

"CAT", 1.50
"BLACK CAT", .95
"CAT FOOD", .86
"CAT TOY", .70

FIG. 3

EXTRACTION OF KEY SECTIONS FROM TEXTS USING AUTOMATIC INDEXING TECHNIQUES

BACKGROUND OF THE INVENTION

This invention relates generally to natural language processing and more particularly to text management.

Numerous sources of information are readily available to interested individuals these days. In addition to the traditional sources found in a town library such as books, magazines and newspapers a person may now search the world wide web to access such traditional sources based out of cities and countries far away. As a result, an individual looking for information on a particular subject these days will typically be faced with an abundance of pertinent material.

Typically referred to as the "information explosion", this onslaught of information can make keeping abreast of the latest information on a particular topic difficult, if not impossible. In many cases, even if only the most pertinent documents describing a topic could be identified, the amount of text identified would often prove too lengthy to be read by the individual in the time available.

What is desired therefore is an automatic means by which to process available documents to provide a reader a synopsis of the material contained in the document. In some cases this synopsis would provide the reader sufficient information however it would also enable the reader to identify those documents which prove worthy of reading in their entirety.

SUMMARY OF THE INVENTION

In accordance with the present invention method and apparatus for condensing a document is provided. The invention includes extracting from the document a list of noun phrases appearing in the document, assigning a weight to each noun phrase occurring in the document noun phrase list and storing the document noun phrase list including said corresponding weights in a memory. The invention further includes the steps of dividing the document into a plurality of identifiable sections, comparing words in each one of the plurality of identifiable sections with the document noun phrase list and providing a count associated with each of said plurality of identifiable sections. Each one of the plurality of identifiable sections is ranked in a descending order by the corresponding count, and the ranks are stored in the memory. A first n number of identifiable sections from the ranks, where n is a predetermined number, are provided as output. With such an arrangement a user is provided with a condensed version of the document including those sections of the document most similar in content to the document as a whole.

In accordance with a further aspect of the invention the noun phrases are ranked in accordance with the frequency with which each of the noun phrases occurs in the document as well as in accordance with the frequency with which each of the noun phrases occurs in the English language. With such an arrangement, the subject matter of the document as a whole may be determined more precisely.

In accordance with a still further aspect of the invention, section ranks are determined in multiple ways. In a first embodiment, a section rank is determined by extracting from each one of the plurality of identifiable sections a list of noun phrases appearing in said section, assigning a weight to each noun phrase occurring in the section noun phrase list and storing the section noun phrase list, including the corresponding weights, in the memory. The count is determined by summing the weights of each noun phrase in the section noun phrase list which also occurs in the document noun phrase list. In a second embodiment, a counter is incremented each time a noun phrase from the document noun phrase list appears in each of the plurality of identifiable sections.

BRIEF DESCRIPTION OF THE DRAWINGS

The above-mentioned and other features of the invention will now become more apparent by reference to the following description taken in connection with the accompanying drawings in which:

FIG. 3 depicts an example of noun phrases and their associated weights identified by the natural language processor of FIG. 1;

DESCRIPTION OF THE PREFERRED EMBODIMENT

Figure 1:
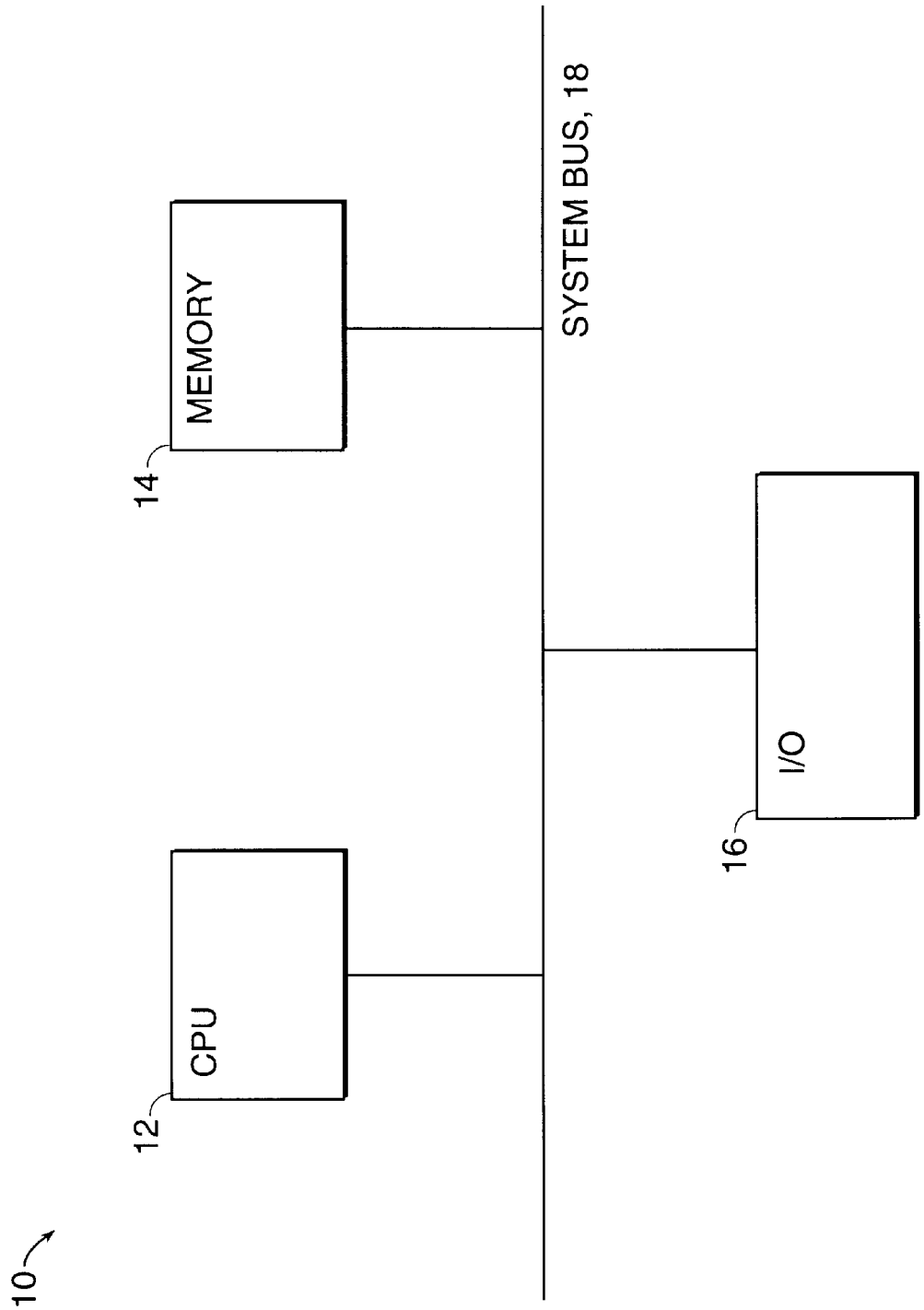
FIG. 1 is a block diagram of a general purpose computer system.

Referring to FIG. 1, a computer system 10 for use with the present invention is shown to include a central processing unit (CPU) 12 for processing an instruction stream. The instruction stream as well as data which is used by the CPU is stored in a memory 14. The CPU 12 and the memory 14 are coupled together via a system bus 18.

Also coupled to system bus 18 is Input/Output (I/O) interface 16. The I/O interface 16 enables the CPU 12 to communicate with a number of external devices via an I/O bus (not shown). The memory 14 contains the executable code of an Extractor 20 which extracts key sections from an input document.

The Extractor 20 is run in the computer system 10 within the CPU 12 which uses the available memory 14. While executing within the CPU 12, the Extractor 20 compiles information about the input document which the Extractor 20 stores in memory 14. This information is used by the Extractor to provide a user an output document which includes those portions of the document which include the text which is most pertinent to the subject of the input document.

This stored information includes multiple lists of noun phrases, a document noun phrase list 26 corresponding to the input document and the section noun phrase lists 26a–26n corresponding to each section of the input document. Additional stored information includes the section ranks 28 for each section of the document as compared to the document noun phrase list 26 and the output text 30. This stored information will be discussed in conjunction with FIG. 2. Also located in memory 14 is the input document which is to be analyzed by the Extractor 20.

Figure 2:
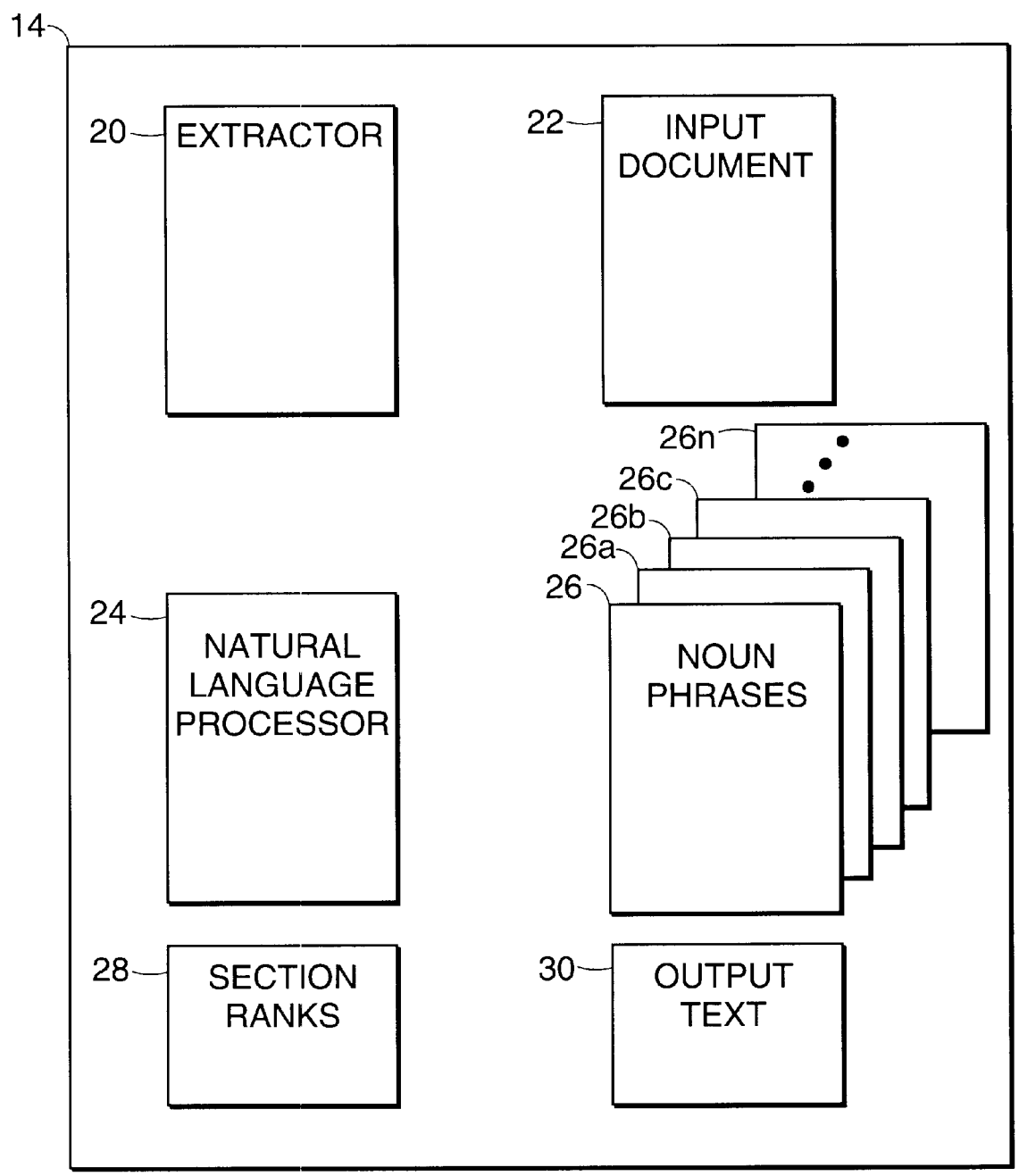
FIG. 2 is a diagram of the memory of FIG. 1.

Referring now to FIG. 2, the executable code of the Extractor 20 is shown to be stored in the memory 14 of FIG. 1. The Extractor 20 receives as input an input document 22 and processes the input document 22 using automatic indexing techniques as practiced here, by a natural language processor 24. The natural language processor 24 analyzes the input document 22 to identify words and phrases which characterize the content of the input document 22. The Extractor stores these characteristic words and phrases, referred to as document noun phrases 26, in memory 14.

Here, the natural language processor 24 used by the Extractor 20 is Clarit which was developed at the Carnegie Mellon University under sponsorship of Digital Equipment Corporation. Other automatic indexing techniques other than Clarit may also be used, provided the output of the technique is a list of words and phrases characteristic of the content of the document, plus their "weights" or numeric measures of importance as will be described below.

Clarit uses natural language processing techniques to parse the contents of the input document into noun phrases. These noun phrases are ranked in view of "weights" assigned to each noun phrase according to their relevance to the content of the document. To determine the ranking of the noun phrases, the number of times the noun phrase occurs in the document is taken into account as well as the frequency with which the noun phrase is used in the English language.

The noun phrases identified by the natural language processor 24 and used in the text and claims are to be understood to include adjectives and other words and phrases which modify a noun. The modifying words are included because these modifiers, in combination with the noun, serve to identify different subjects. For example, referring now to FIG. 3, the phrases "cat", "black cat", "cat food" and "cat toy" are all distinctive noun phrases identified by the natural language processor 24.

In addition to identifying these noun phrases, the natural language processor 24 also ranks the phrases in view of two separate criteria. The first criterion is simply the number of times the noun phrase appears within the document. This presumes that those noun phrases used most frequently within the document are typically related to the subject matter of the document.

The second criterion reflects the typical usage of the noun phrase in the English language. For example, the noun phrase "black cat" is used more frequently in the English language than the phrase "green cat". Accordingly, should the phrase "green cat" appear in the document, it would be ranked higher by the natural language processor 24 than "black cat" in relation to frequency of use in the English language. This occurs because "green cat" occurs infrequently in the English language and therefore greater significance is accorded to it use in relation to the subject of the document than "black cat" which occurs more frequently and may therefore be less indicative of the subject of the document. Also included in FIG. 3 therefore, are the corresponding ranks for each of the identified noun phrases.

Referring back to FIG. 2, once the document noun phrases 26 have been identified and ranked by the natural language processor 24, the input document 22 is divided into identifiable sections. These sections may correspond, for example, to chapters, paragraphs or sentences. Here the section definition may be provided by the user or may be a default value provided by the natural language processor 24 if the user chooses the default.

Figure 4:
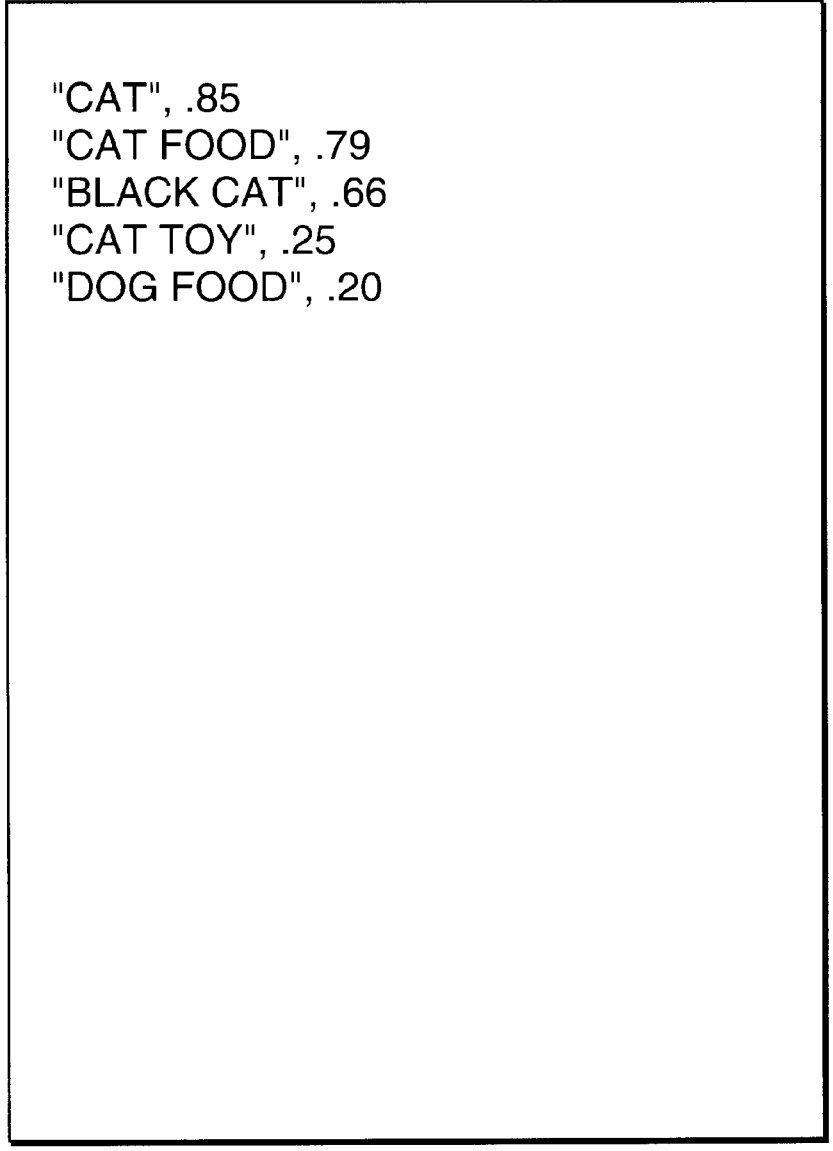
FIG. 4 depicts an example of noun phrases and their associated weights identified by the natural language processor of FIG. 1 when analyzing a single section of an input document.

Each section of the document is analyzed by the natural language processor 24 to provide a section noun phrase list 26a–26n, which corresponds to that section. The analysis of the sections of the document are done identically to the analysis of the entire document as described above, where the noun phrases are identified and ranked according to usage in the section as well as the frequency used in the English language. A "score" or count is assigned to each section indicating the number of section noun phrases 26a which are also found in the document noun phrase list 26. Referring now to FIG. 4, only the weights corresponding to the phrases "cat", "cat food", "black cat" and "cat toy", which are found in the document noun phrase list 26, will be used to determine this section's "score". The noun phrase "dog food", which is not found in the document noun phrase list 26, would not be included in the section "score". One method of determining the "score" for a section is to simply add the weights associated with each of the noun phrases identified for the section which are also found in the document noun phrase list 26. The sections are ranked in accordance with this "score". These section ranks 28 are stored in memory 14.

From the section ranks 28, the Extractor 20 determines which paragraphs of the original input document 22 will appear in the output text. Here, the amount of text provided in the output, for instance, the top five sections, may be specified by the user or it may be a default value provided by the Extractor 20 if the user chooses the default. Although the amount of text in the output is usually determined in the same unit as the document section, this may be provided in a different unit such as sentences. For example, although the analysis is done on a paragraph basis, the output could be provided based upon a number of lines. This would be done by simply ranking the paragraphs as done before and outputting lines of the paragraphs until the specified number of lines have been achieved.

Once the top "n" paragraphs are identified by the section ranks 28, the Extractor 20 copies these paragraphs from the input document 24 to an output text 30 file in memory 14. When copying these paragraphs, the original order of the paragraphs are maintained. Where portions of the original text is missing from the output an ellipses, " . . . ", is typically included in the output text 30 file to represent the missing text and to indicate that the input document 22 is not included in its entirety in the output text 30 file.

Figure 5:
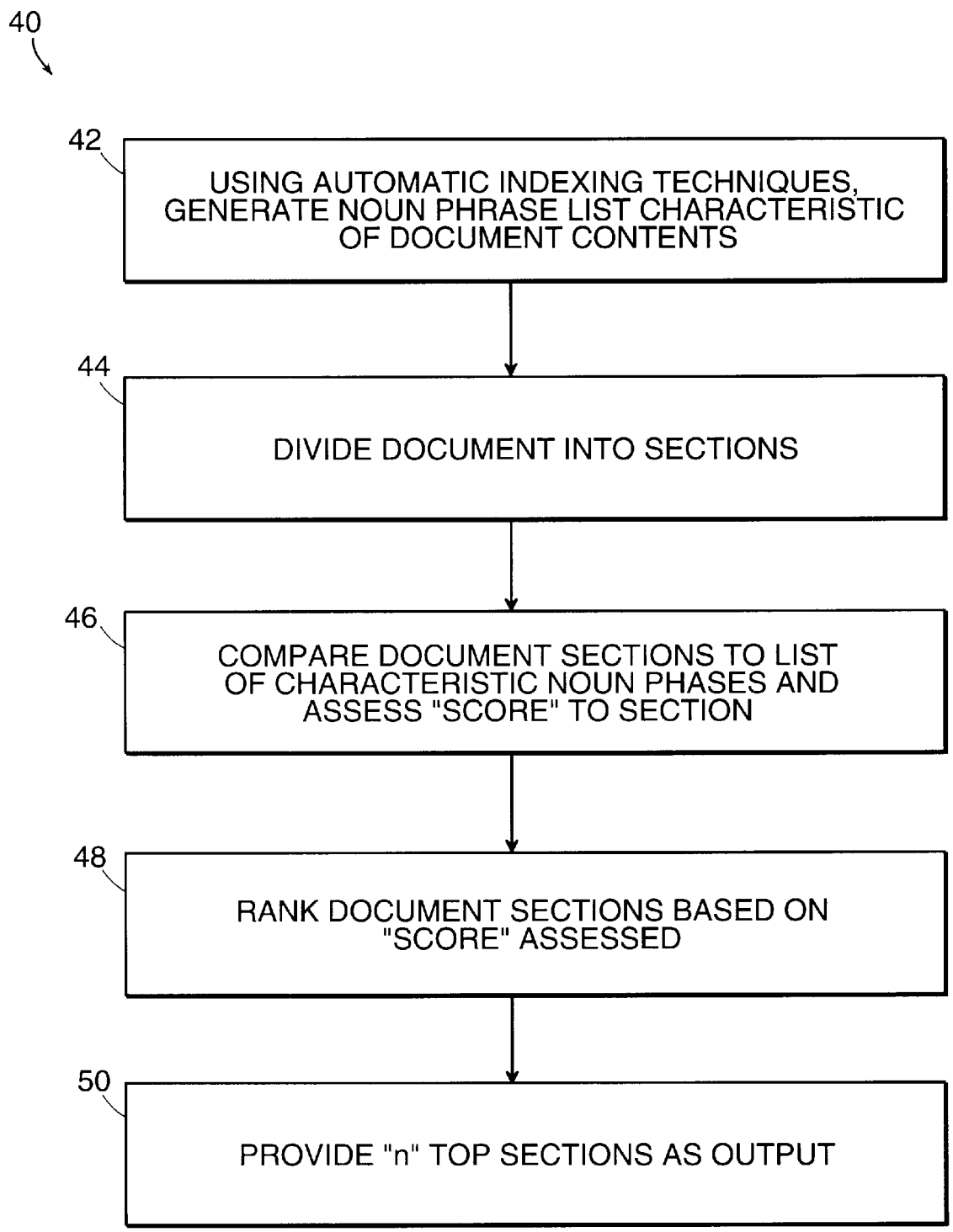
FIG. 5 is a flowchart depicting an embodiment of the document condensation process.

Referring now to FIG. 5, a flowchart of a document condensation process 40 is shown to begin at step 42 where a document noun phrase list is generated by automatic indexing techniques. The document noun phrase list includes those words and phrases characteristic of the content of an input document. Here, a natural language processor, Clarit, is used to identify the noun phrases, however any automatic indexing technique may be used which identifies words and phrases characteristic of the subject matter of the input document and provides "weights" to each of the noun phrases indicating their relevance to the subject matter of the document as a whole.

In addition to identifying the noun phrases, the natural language processor also ranks the noun phrases. The ranking criteria used determines the number of times a noun phrase appears within the document as well as the frequency with which the noun phrase is typically used in English conversation or writings. In this way a noun phrase such as "black cat" appearing 20 times in a document may be ranked lower than a noun phrase such as "green cat" appearing 15 times because "green cat" is not used as frequently as "black cat" in the English language. Accordingly, the use of the noun phrase "green cat" may be more suggestive of the subject of the document if such an infrequently used word has been included in the document.

At step 44; the document is divided into sections. These sections will typically correspond to identifiable sections in the document itself. For instance, the document may be divided into lines, sentences, paragraphs, or chapters. The section definition can be provided by a user or may be a default value set by the document condensation process itself if the user chooses the default.

At step 46, the document sections are compared against the list of noun phrases determined at step 42. In a first embodiment, the document section is compared against the list of noun phrases. For each match of a phrase from the noun phrase list to a phrase appearing in the document part a count is incremented, the final count resulting in a score for that document section.

In a second embodiment, each section is passed through the natural language processor to compare it to the noun phrase list. The result is a second list of those noun phrases which appear in both the noun phrase list and the document section. In addition, a weight for each matching term is computed. This weight is assigned as were the weights during the noun phrase identification step. That is, the number of times the noun phrase appears as well as the frequency with which it is used in typical English are determined and a weight is assigned accordingly. The resulting score for the document section is a sum of the weights for each of the matching terms.

At step 48, the document sections are ranked in accordance with the score each section received in step 46. Those sections receiving high scores, corresponding to a higher relevance of the section to the subject of the entire document, are ranked highest while those sections with low scores, and a correspondingly lower relevance to the document subject, are ranked lower.

At step 50, the output of the document condensation process is produced. Here, the amount of output is determined either through user input or by default. That is, the output is of a fixed length of sections from the input document specified by a user or provided as a default by the system. Although typically, the sections will be of the same units as the sections defined at step 44, this is not required.

Once the number of sections is known, using the output of step 48, the top "n" sections are identified. To provide the final output file, the sections are copied from the input document in the original order in which they appeared. That is, if section 10 ranked higher than section 5, section 5 would appear first in the output for coherency. Where sections in the output are not adjacent sections in the original some indication of the break in the document sequence will be included in the output, typically an ellipses " . . . ".

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A method for automatically condensing a document containing noun-phrases, to produce a synopsis of the document comprising the steps of:

automatically extracting from said document a list of noun-phrases appearing in said document;

assigning a weight to each noun-phrase occurring in said document noun-phrase list;

storing said document noun-phrase list including said corresponding weights in a memory;

dividing said document by using user input into a plurality of identifiable document-sections;

comparing words in each one of said plurality of identifiable document-sections with said document noun-phrase list;

providing a count associated with each of said plurality of identifiable document-sections;

ranking each one of said plurality of identifiable document-sections in a descending order by said count;

storing said ranks in said memory;

providing as output, using said ranks, a first n number of identifiable document-sections from said ranks where n is a predetermined number; and producing a synopsis of said document wherein said number of identified document-sections in the synopsis are in a sequence unchanged from how they existed in the document.

2. The method of claim 1 wherein said step of extracting includes the step of:

ranking each of said noun-phrases in accordance with a frequency with which said each of said noun-phrases occurs in said document.

3. The method of claim 2 wherein said step of extracting includes the step of:

ranking each of said noun-phrases in accordance with a frequency with which said each of said noun-phrases occurs in the English language.

4. The method of claim 1 wherein said step of dividing using user input is preceded by the step of:

providing, from a user, a definition of a document-section.

5. The method of claim 1 wherein said step of comparing includes the step of:

extracting from said each one of said plurality of identifiable document-sections a list of noun-phrases appearing in said document-section;

assigning a weight to each noun-phrase occurring in said document-section noun-phrase list; and storing said document-section noun phrase list, including said corresponding weights, in said memory.

6. The method of claim 5 wherein said step of providing a count includes the step of:

summing the weights of each noun phrase in said document-section noun-phrase list which also occurs in said document noun-phrase list.

7. The method of claim 1 wherein said step of providing a count includes the step of:

incrementing a counter each time a noun phrase from said document noun-phrase list appears in said each of said plurality of identifiable document-sections.

8. An apparatus for automatically condensing a document which includes noun-phrases, to produce a synopsis of the document, said apparatus comprising:

means for automatically extracting from said document a list of noun-phrases appearing in said document;

means for assigning a weight to each noun-phrase occurring in said document noun-phrase list;

means for storing said document noun-phrase list including said corresponding weights in a memory;

means for dividing said document by using user-input, into a plurality of identifiable document-sections;

means for comparing words in each one of said plurality of identifiable document-sections with said document noun-phrase list;

means for providing a count associated with each of said plurality of identifiable document-sections;

means for ranking each one of said plurality of identifiable document-sections in a descending order by said count;

means for storing said ranks in said memory; and means for providing as output using said ranks, a first n number of identifiable document-sections from said ranks where n is a predetermined number, to produce a document synopsis wherein said n number of identifiable document-sections are in a sequence unchanged from how they existed in the document.

9. The apparatus of claim 8 further including:

means for ranking each of said noun phrase in accordance with a frequency with which said each of said noun-phrases occurs in said document.

10. The apparatus of claim 9 further including:

means for ranking each of said noun-phrase in accordance with a frequency with which said each of said noun-phrase occurs in the English language.

11. The apparatus of claim 8 further including:

means for providing, from a user, a definition of document-section.

12. The apparatus of claim 8 further including:

means for extracting from said each one of said plurality of identifiable document-sections a list of noun-phrase appearing in said document-section;

means for assigning a weight to each noun-phrase occurring in said document-section noun-phrase list; and means for storing said document-section noun-phrase list including said corresponding weights in said memory.

13. The apparatus of claim 12 further including:

means for summing the weights of each noun-phrase in said document-section noun-phrase list which also occurs in said document noun-phrase list.

14. The apparatus of claim 8 further including:

means for incrementing a counter each time a noun-phrase from said document noun-phrase list appears in said each of said plurality of identifiable document-sections.

\* \* \* \* \*